May 27, 1969
J. THORDARSON
3,445,891
APPARATUS FOR MANUFACTURING FILM FROM THERMOPLASTIC
RESINOUS FILM-FORMING MATERIALS
Filed Oct. 24, 1966
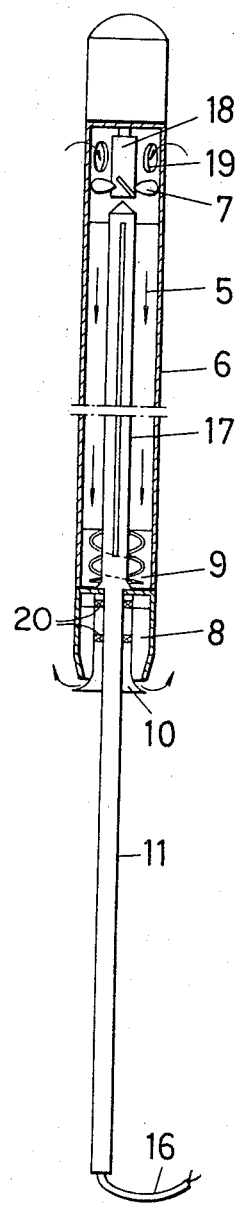
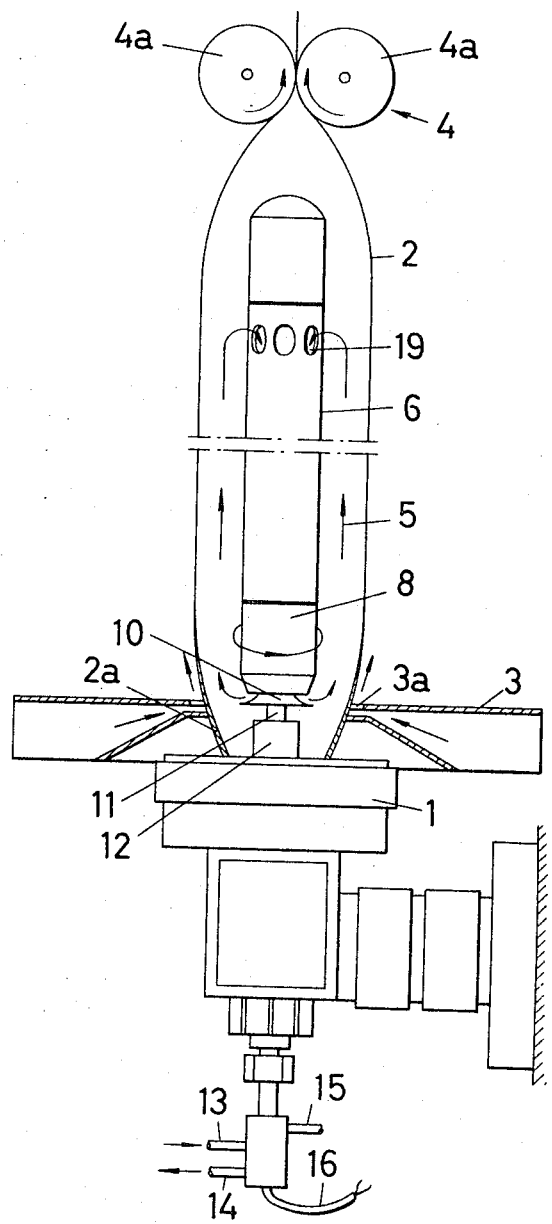
Inventor
Jon Thordarson
by Watson, Cole, Grindle & Watson
Attorneys

# United States Patent Office 3,445,891
Patented May 27, 1969

3,445,891
APPARATUS FOR MANUFACTURING FILM FROM THERMOPLASTIC RESINOUS FILM-FORMING MATERIALS
Jon Thordarson, Reykjalundur, Reykjavik, Iceland
Filed Oct. 24, 1966, Ser. No. 589,135
Claims priority, application Norway, Oct. 27, 1965, 160,235
Int. Cl. B29d 23/04
U.S. Cl. 18—14    5 Claims

ABSTRACT OF THE DISCLOSURE

Apparatus is described for the continuous extrusion of thermoplastic seamless tubing which is immediately cooled following extrusion by a radially directed cooling gas against the internal surface of the tube. To insure that the cooling gas stream is uniform thus minimizing irregularities in the tube, the nozzle means having an annular radially directed outlet passage is rotatably mounted so that any irregularities in the cross section of the air stream or in the nozzle means itself are cancelled out through rotation of the nozzle means.

---

The present invention relates to an improved apparatus for extruding seamless tubing or film. In such apparatus, a film forming polymer, such as polyethylene, is extruded through an annular die arranged in an extrusion head, in which a thorough homogenizing of the thermoplastic material is effected prior to the extrusion proper. Hereby the material is extruded so as to form a tube having a smaller outer diameter than the intended diameter of the eventually produced film tube, the film tube formed being inflated by gas under a certain pressure, in the following merely referred to as air pressure, maintained inside the tube and the film tube, for instance by maintaining a constant communication between the "bubble" having been formed and a source of gas or air under constant pressure, to the effect that the tube, due to its semi-plastic state, is inflated by the pressure and is adopting a gradually smaller wall thickness, until the material has been cooled to such a degree that expansion is no longer possible. The resultant product will be a film tube having a wall thickness, which within certain limits, is substantially uniform. By the compression of the film tube between the wind-up rolls drawing the tube from the die substantial escape of the air in the bubble is prevented, to the effect that the air having once been supplied to the film-bubble, may practically be considered as to stationary, with no possibility of escaping. However, said air gradually acquires a rather high temperature, which inherently represents an obstacle to an unlimited increase of the extrusion velocity, and external cooling has therefore been applied to the bubble, in order thereby to permit an increase of the extrusion velocity.

The object of the present invention is an arrangement permitting internal cooling of the bubble, comprising an extended cooling column mounted on the central portion of the extrusion head, and extending in the direction of extrusion within the gas space or bubble formed by the inflation of the extruded tube or film tube, the cooling column being provided with devices for forced circulation of the gas contained within the bubble.

Advantageously, the cooling column is made in the form of a heat exchanger, having separate circulation systems for the air to be cooled and for a coolant, preferably water.

The cooling column may accommodate an axially extending cooling element, and coolant is supplied to and withdrawn from the column through a hollow supporting mast.

The hollow mast supporting the cooling column is mounted on the central extruder core and accommodates the piping for charging and withdrawing cooling water, for supplying air under constant pressure for inflating the bubble, and electrical wires for the operation of means for forced circulation of the gas contained within the bubble, thereby providing a simple and reliable structure.

As a means for the forced circulation of the gas in the bubble along the hollow cooling column, a motor driven fan is mounted at the top of the cooling column. Hereby, it is secured that the air within the cooling tower is caused to circulate in close contact with cooling elements which are mounted within the cooling column and through which cold cooling water flows.

Stationary, helical baffles are mounted at the lower end of the cooling column, so that the air passing downwardly along the column adopts a helical motion before passing out through the lower end of the cooling column, and then upwardly in the annular space between the exterior of the column and the inside of the bubble, thereby effecting the desired interior cooling of the extruded film tube.

On the exit side of said stationary, helical baffles, there may be mounted a freely rotating nozzle provided with one or more essentially radially directed exit passages, so that the flow of air leaving the column is directed essentially radially towards the inner surface of the film tube as an essentially uniform flow all around the column.

The apparatus may, of course, advantageously be provided with means, known per se for external cooling of the film tube, such as a blowing box provided with an annular slot surrounding the extrusion head, so as to direct cold air upwardly all around the exterior of the extruded film tube.

By constantly circulating one and the same quantity of air through the cooling column and blowing it against the inner film surface, a uniform and highly effective cooling of the film is obtained. It has been found that it is possible to increase the extrusion velocity for the film foil with more than 50% in relation to the previously known technique with only external cooling of the film tube, as the uniform cooling induces a definite quality improvement, both as to uniformity in film thickness and homogeneity in the produced film. At the same time the improved cooling effect allows the use of a bubble of a shorter length than hither to possible.

An apparatus according to the invention is described in the ensuing description of a preferred embodiment of the same, reference being made to the accompanying figures, wherein:

FIGURE 1 is a schematic view of the apparatus, with extrusion head mounting the cooling column, and illustrating the principle of the air circulation.

FIGURE 2 is a view, partly in section, of the cooling element.

In FIGURE 1, 1 is an extrusion head for production of a film tube 2, which is extruded in the form of a tube 2a having somewhat higher wall thickness than that envisaged for the ultimate film tube 2. 3 is an external blowing box having a circular slot 3a which directs cooling air upwardly around the extruded film tube 2. The film tube is drawn off by means of wind-up rolls 4 which also serve as a gas trap by being pressed so strongly against each other that the air in the bubble can not escape. The film tube 2 is then wound up on rolls or cut in a manner known per se. The flow direction of the air is indicated with arrows 5, i.e. upwardly in the space between a cooling column 6 and the film tube 2, and downwardly in the cooling column 6. An electric driven fan 7 is mounted at the top of the cooling column, in the illustrated embodiment within the cooling column. At the lower end, the cooling column 6, is provided with a freely rotating air nozzle 8 to the end of securing uniform discharge of the air which has been subjected to cooling when passing downwardly through the column 6. The rotating nozzle 8, together with stationary helical baffles 9 mounted within the lowermost portion of the column 6 operate to endow the air with a helical movement, to the effect that the air, after having caused the nozzle 8 to rotate, and passing through the lowermost portion 10 of the rotating nozzle, which is provided with at least one or more radially directed outlet channels, in directed substantially radially towards the film tube 2a, 2.

As also shown in FIGURE 1, a hollow mast 11 is provided, for the purpose of assembling the apparatus on the central core 12 of the extrusion head 1. The mast 11 is passed through said central core, and the cavity of the same accommodates pipings 13, 14 for supply and discharge, respectively, of cooling water, pipe 15 for supply of air under a constant static pressure for the inflation of the film tube 2 to the bubble form referred to above, as well as leads 16 for electric power for operating the fan means 7.

FIGURE 2 is a more detailed view of the cooling column 6, and clearly shows how the circulation of the air in the bubble is effected. The cooling column 6 is hollow and holds an elongated cooling element 17 through which the cooling water flows. The fan 7 is mounted at the top of the cooling column and is driven by an electric motor 18 for the purpose of drawing heated air from the top portion of the bubble inwardly through the perforations 19 at the top of the cooling column and to force such air downwardly through the column and along the length of the cooling element 17. The stationary, helically shaped baffles 9 which endow the cooled air with a rotational movement are mounted in the lower end of the column, so that the nozzle 8, which is freely rotatably mounted with bearings 20 on the lower end of the column, and provided with one or more substantially radially directed outlet passages. Consequently, the air is endowed with a rotational movement so that the cold air leaving the column 6 is directed essentially radially towards the film tube 2a and provides a uniform cooling of the same.

In the device shown and described air is used as inflating and cooling agent, but evidently, use might equally well be made of more inert gases, such as carbon dioxide, nitrogen, etc. for the same purposes. Moreover, it will be understood that other coolants than water might be used as a coolant to the gas within the bubble, although water in most cases will represent the most practical solution.

I claim:

1. Apparatus for the production of thermoplastic seamless tube comprising an extrusion head having an annular extrusion orifice and means centrally located adjacent said extrusion head for cooling and radially directing cooling gas against the internal surface of continuously extruded thermoplastic tubing, said means for cooling and radially directing cooling gas comprising a stationary housing having an elongated chamber therein, said chamber extending in an axial direction with respect to said annular extrusion orifice and having an inlet for the cooling gas at the end opposite said extrusion orifice, means for directing a stream of cooling gas from said inlet through said chamber, cooling means in said chamber for cooling said stream of gas as it passes therethrough, and nozzle means between said stationary housing and said extrusion head, said nozzle means comprising a second housing which is rotatably mounted, said rotatable housing having a further chamber therein having an inlet at one end thereof for receiving said cooling gas from said stationary housing and an annular substantially radially directed outlet passage, said outlet passage being unobstructed whereby upon rotation of said second housing a uniform omni-radial stream of cooling gas is directed against the interior surface of the extruded tube and along a path away from said extrusion head and contiguous to the interior surface of the extruded tube towards said inlet in said chamber of said stationary housing.

2. Apparatus as claimed in claim 1 wherein means is provided in the chamber of said stationary housing for imparting a helical flow pattern to said cooling gas.

3. Apparatus as claimed in claim 2 wherein said means for imparting a helical flow pattern to said cooling gas comprises a plurality of stationary helical baffles.

4. Apparatus as claimed in claim 2 further comprising baffles mounted in said rotatably mounted housing for maintaining the helical flow pattern of said cooling gas and imparting rotation to said rotatable housing as said cooling gas flows therethrough.

5. Apparatus as claimed in claim 1 wherein said cooling means comprises an elongated cooling element extending in an axial direction within the chamber of said stationary housing.

References Cited

UNITED STATES PATENTS

| 2,966,700 | 1/1961 | Dyer et al. | 18—145 XR |
| 3,170,011 | 2/1965 | Cheney et al. | |
| 3,280,429 | 10/1966 | Haley. | |
| 3,329,999 | 7/1967 | Cools | 18—145 |

FOREIGN PATENTS

| 828,851 | 1960 | Great Britain. |
| 1,434,501 | 2/1966 | France. |

WILLIAM J. STEPHENSON, *Primary Examiner.*

Notice of Adverse Decision in Interference

In Interference No. 97,697 involving Patent No. 3,445,891, J. Thordarson, APPARATUS FOR MANUFACTURING FILM FROM THERMOPLASTIC RESINOUS FILM-FORMING MATERIALS, final judgment adverse to the patentee was rendered Oct. 15, 1973, as to claims 1 and 5.

[*Official Gazette May 21, 1974.*]